US012682519B2

(12) United States Patent
Liu et al.

(10) Patent No.: US 12,682,519 B2
(45) **Date of Patent: \*Jul. 14, 2026**

(54) METHOD AND APPARATUS FOR SYNCHRONOUSLY DISPLAYING MEASUREMENT DATA AND COMPUTER READABLE STORAGE MEDIUM

(71) Applicant: SHANGHAI TOSUN TECHNOLOGY LTD., Shanghai (CN)

(72) Inventors: Chu Liu, Shanghai (CN); Yueyin Xie, Shanghai (CN); Mang Mo, Shanghai (CN)

(73) Assignee: SHANGHAI TOSUN TECHNOLOGY LTD., Shanghai (CN)

( * ) Notice: Subject to any disclaimer, the term of this patent is extended or adjusted under 35 U.S.C. 154(b) by 250 days.

This patent is subject to a terminal disclaimer.

(21) Appl. No.: 18/512,085

(22) Filed: Nov. 17, 2023

(65) Prior Publication Data

US 2025/0166253 A1 May 22, 2025

(51) Int. Cl.
*G06T 11/26* (2026.01)

(52) U.S. Cl.
CPC .......... *G06T 11/26* (2026.01); *G06T 2200/24* (2013.01)

(58) Field of Classification Search
None
See application file for complete search history.

(56) References Cited

U.S. PATENT DOCUMENTS

2005/0133488 A1 6/2005 Blankenship et al.
2007/0143357 A1* 6/2007 Chaudhri ............ H04L 67/1095

2011/0181608 A1 7/2011 Sunkara et al.
2012/0066641 A1 3/2012 Doherty
2016/0246348 A1 8/2016 Ambapuram et al.
2017/0069147 A1 3/2017 Palmer et al.
(Continued)

FOREIGN PATENT DOCUMENTS

CN       101572641 A    11/2009
CN       101627358 A    1/2010
(Continued)

OTHER PUBLICATIONS

Struggling blue algae, Python graphical interface basics: passing data between different windows, 2023, pp. 1-7, retrieved from: https://blog.csdn.net/qq_38161040/article/details/132920423.
(Continued)

*Primary Examiner* — Michael J Cobb
(74) *Attorney, Agent, or Firm* — Bayramoglu Law Offices LLC

(57) ABSTRACT

A method of synchronously displaying measurement data includes: setting a synchronization identifier and a synchronization function for a plurality of measurement data display windows respectively; when a display time span of any measurement data display window in a paused state is modified, calling the synchronization function of other measurement data display windows in a paused state, and matching the synchronization identifier of the measurement data display window in a paused state with the synchronization identifiers of other measurement data display windows in a paused state in the synchronization function; if successfully matching, performing synchronization operation.

18 Claims, 13 Drawing Sheets

(56) References Cited

U.S. PATENT DOCUMENTS

| | | | |
|---|---|---|---|
| 2017/0161970 A1 | 6/2017 | Correa et al. | |
| 2018/0198599 A1 | 7/2018 | Mihelic | |
| 2019/0394747 A1 | 12/2019 | Akkarakaran et al. | |
| 2021/0164766 A1* | 6/2021 | Reime .................... | H03K 17/97 |
| 2021/0255757 A1 | 8/2021 | Merg et al. | |
| 2022/0180676 A1 | 6/2022 | Thaung | |
| 2023/0196850 A1 | 6/2023 | Weiland et al. | |
| 2025/0060737 A1 | 2/2025 | Zheng | |

FOREIGN PATENT DOCUMENTS

| | | | |
|---|---|---|---|
| CN | 103488393 A | 1/2014 | |
| CN | 109100159 A | 12/2018 | |
| CN | 112596972 A | 4/2021 | |
| CN | 113296654 A | 8/2021 | |
| CN | 114356271 A | 4/2022 | |
| CN | 114630007 A | 6/2022 | |
| CN | 115422298 A | 12/2022 | |
| CN | 115437337 A | 12/2022 | |
| CN | 115658617 A | 1/2023 | |
| CN | 116980435 A | 10/2023 | |
| JP | 2003075473 A | 3/2003 | |
| JP | 2010072829 A | 4/2010 | |
| JP | 2016170120 A | 9/2016 | |
| RU | 2619896 C2 | 5/2017 | |
| RU | 2693909 C2 | 7/2019 | |

OTHER PUBLICATIONS

Screen captures from bilibili video clip entitled "[Official self-made] CANoe/CANalyzer basic tutorial collection (completed) a total of 18 pages," 4 pages, uploaded on Jan. 18, 2021 by user "Victor Automotive Technology". Retrieved from Internet: https://www.bilibili.com/video/BV1t54y1s7Qo/?p=3&share_%20source=copy_web&vd_%20source=562163e6f37d481a2fccdded3adcc3f4&vd_source=9d466b2ad7a4c9e038b94e2e48ae7b58.

Hongke Automobile Intelligent Interconnection, Hongke Solution/Automative CAN/LIN bus data acquisition solution, 2023, pp. 1-10, retrieved from: https://blog.csdn.net/hongkeqiche/article/details/133694320.

Donglei Wu, The Application of CANoe software in AMT Engine Torque Test, Focus, 2008, pp. 40-43, U467.2.

Zhitao Li, Research and Analysis of Data Playback Test Based on CANoe, Software Application, 2016, pp. 48-51, 1003-8639(2018)11-0026-03.

What is the use of CANoe window synchronization Window Synchronization, Canoe, 2022, retrieved from: https:// zhuanlan.zhihu.com/p/550841724?utm_id=0.

Hui Liu, et al., The Simulation of Power On/off Control Process for Electric Vehicles Based on CANoe/Matlab, 2018, pp. 26-28,31, 1003-8639(2018)11-0026-03.

Wang Yongsheng, et al., Co-simulation of transfer alignment and CAN busbased on CANoe-MATLAB, IOP Conference Series: Materials Science and Engineering, 2020, pp. 1-5, vol. 715.

* cited by examiner

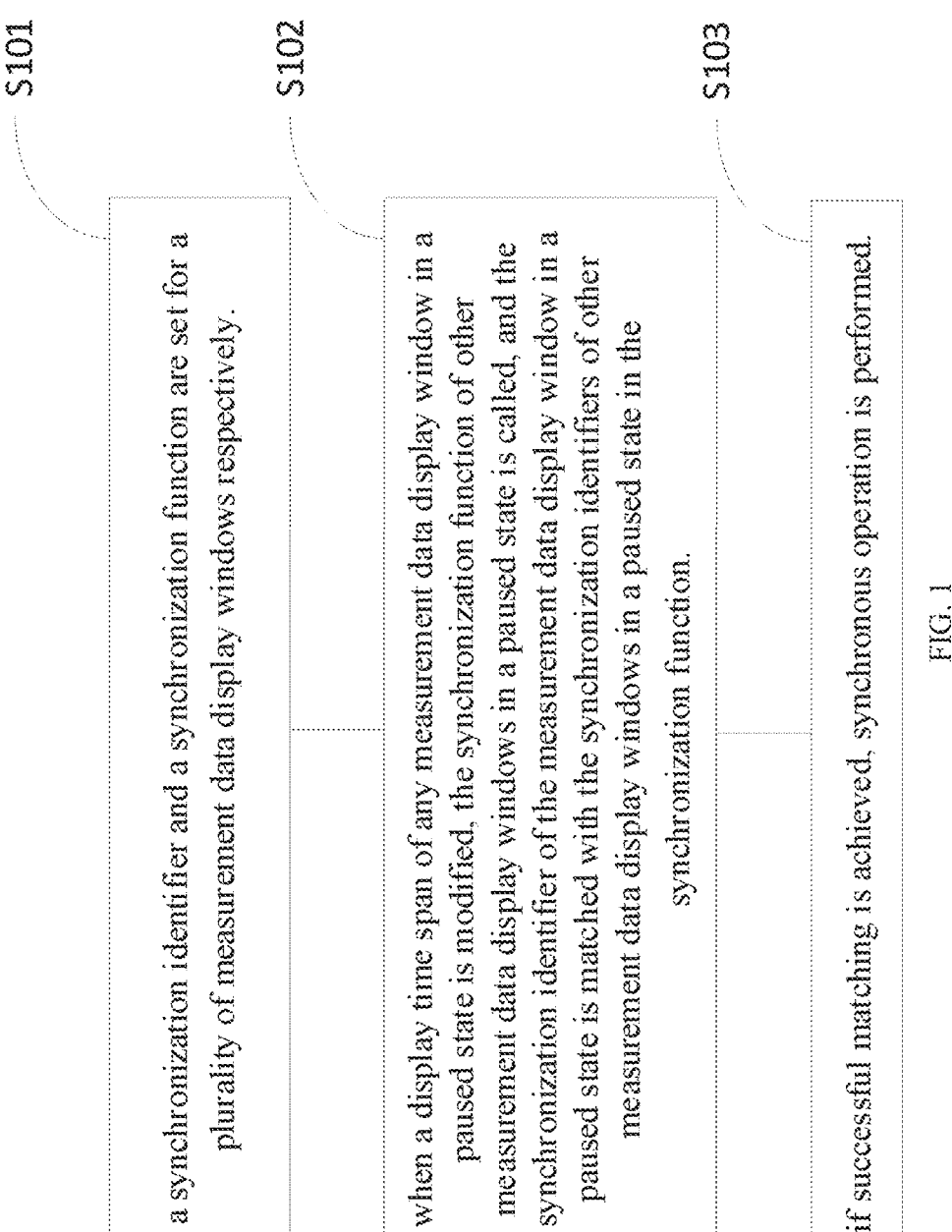

S101 a synchronization identifier and a synchronization function are set for a plurality of measurement data display windows respectively.

S102 when a display time span of any measurement data display window in a paused state is modified, the synchronization function of other measurement data display windows in a paused state is called, and the synchronization identifier of the measurement data display window in a paused state is matched with the synchronization identifiers of other measurement data display windows in a paused state in the synchronization function.

S103 if successful matching is achieved, synchronous operation is performed.

FIG. 1

METHOD AND APPARATUS FOR SYNCHRONOUSLY DISPLAYING MEASUREMENT DATA AND COMPUTER READABLE STORAGE MEDIUM

TECHNICAL FIELD

The present disclosure relates to the field of measurement technologies and in particular to a method and system for synchronously displaying measurement data.

BACKGROUND

The measurement data display window in a vehicular software needs to display a plurality of signals, for example, the graphical window needs to display a curve of multiple signals. As required by a vehicle test, these signals are to be grouped, for example, a group relating to a power assembly, and a group relating to chassis electric control. These different groups are to be displayed on different measurement data display windows to avoid mutual influence.

SUMMARY

The present disclosure provide a method of synchronously displaying measurement data, including:

setting a synchronization identifier and a synchronization function for a plurality of measurement data display windows respectively;

when a display time span of any measurement data display window in a paused state is modified, calling the synchronization function of other measurement data display windows in a paused state, and matching the synchronization identifier of the measurement data display window in a paused state with the synchronization identifiers of other measurement data display windows in a paused state in the synchronization function;

if successfully matching, performing synchronization operation.

The summary of the present disclosure aims to provide brief descriptions for the subjects of the specification. Thus, it should be understood that the above features are only illustrative and shall not be interpreted as narrowing the scope or essence of the subject of the specification in any way.

Other features, aspects and advantages of the subjects of the present disclosure will become apparent by way of the specific embodiments, drawings and claims.

BRIEF DESCRIPTION OF THE DRAWINGS

In order to more clearly describe the technical solutions in the embodiments of the present disclosure or in the prior arts, the drawings required for descriptions of the specific embodiments or the prior arts will be briefly introduced. Apparently, the drawings described hereunder are only some embodiments of the present disclosure. Those skilled in the arts can obtain other drawings based on these drawings without making creative work.

FIG. 1 is a step diagram illustrating a method of synchronously displaying measurement data according to one or more embodiments of the present disclosure.

DETAILED DESCRIPTION OF THE EMBODIMENTS

Figure 2:
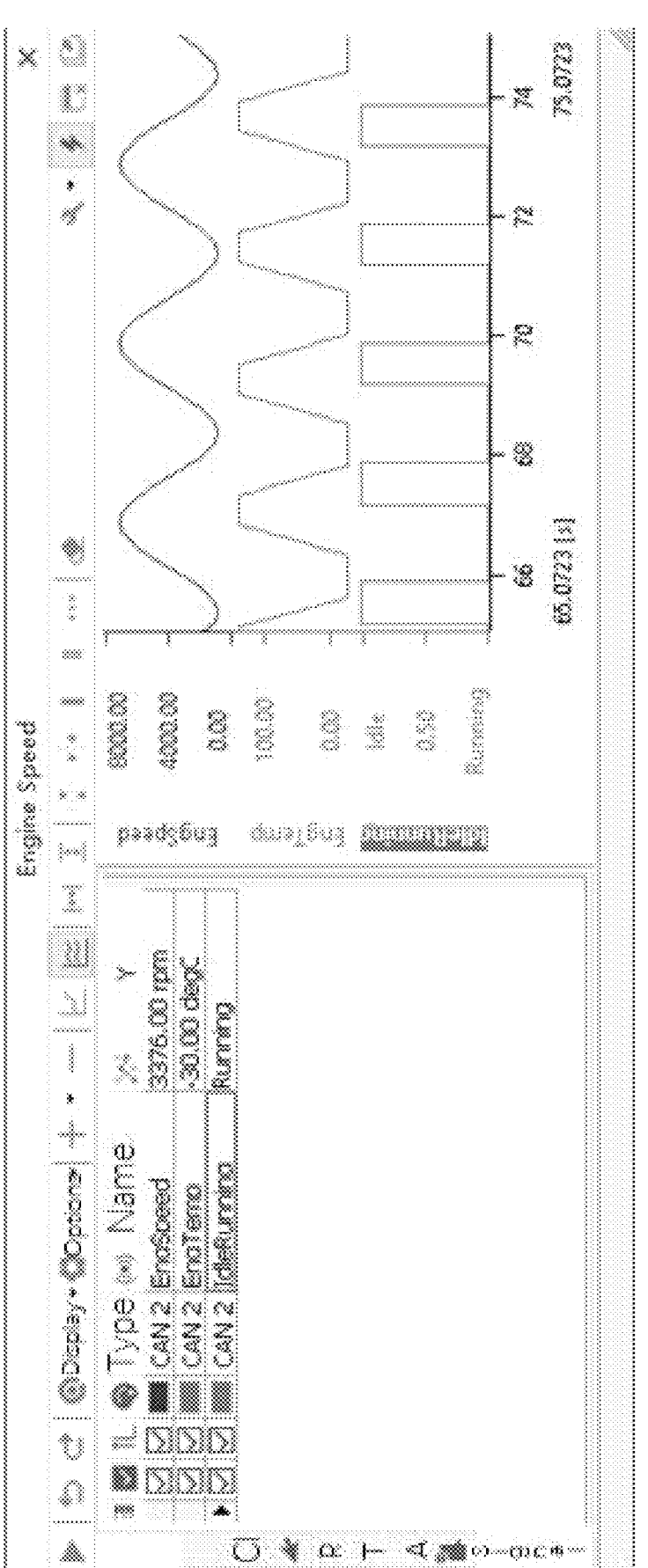
FIG. 2 is a schematic diagram illustrating a graphical window according to one or more embodiments of the present disclosure.

In order to make the object, technical solutions and advantages of the embodiments of the present disclosure clearer, the technical solutions of the present disclosure will be fully and clearly described in combination with drawings. Apparently, the embodiments described herein are only some embodiments rather than all embodiments. All other embodiments obtained by those skilled in the art based on these drawings without making creative work shall fall within the scope of protection of the present disclosure.

The measurement data display window in a vehicular software needs to display a plurality of signals, for example, the graphical window needs to displays a curve of multiple signals. As required by a vehicle test, these signals are to be grouped, for example, a group relating to a power assembly, and a group relating to chassis electric control. These different groups are to be displayed on different measurement data display windows to avoid mutual influence.

When these groups are actually used, it is usually required to synchronize a time axis to view signals, for example, observe wheel speed signals at the time of gear shift. In this case, it is required to synchronize the signals in the group relating to the power assembly with the signals in the group relating to chassis electric control for displaying.

In order to address this problem, in the related arts, it is a general practice for some software platforms to divide one measurement data display window into multiple columns, where each column displays one group of signals and all columns share one time axis. When the graduation of the time axis changes, all columns will display current signals based on the graduation of the time axis, achieving synchronous display.

However, this method has its own disadvantage that the columns cannot display all the signal groups in a case of too many signal groups. Further, this method uses one window to couple multiple groups of signals, which is unfavourable for test function division.

Therefore, at least one embodiment of the present disclosure provides a method of synchronously displaying measurement data, including: setting a synchronization identifier and a synchronization function for a plurality of measurement data display windows respectively; when a display time span of any measurement data display window in a paused state is modified, calling the synchronization function of other measurement data display windows in a paused state, and matching the synchronization identifier of the measurement data display window in a paused state with the synchronization identifiers of other measurement data display windows in a paused state in the synchronization function; if successfully matching, performing synchronization operation.

In some embodiments, the method of synchronously displaying measurement data is to carry out synchronization between different measurement data display windows. The measurement data display windows include but not limited to a graphical window and a packet information window and the like. Further, the time ranges of the packet information window and the graphical window can be synchronized by any combination.

The method of synchronously displaying measurement data in some embodiments is especially applicable to synchronous display of vehicle bus measurement data in the vehicle bus tool software. Specifically, the method of synchronously displaying measurement data in the vehicle bus tool software can carry out synchronous display in the following application scenarios.

1) When signals in a specific period of time in a packet list are analyzed, the curves of other packets within the period of time in the graphical window can be viewed synchronously and vice versa.

2) When signals in a specific period of time in a graphical window are analyzed, the curves of other packets within the period of time in other graphical windows can be viewed synchronously and vice versa.

3) When signals in a specific period of time in a packet list are analyzed, the signal values within the period of time in the other packet information windows can be viewed synchronously and vice versa.

4) When signals in a specific period of time in a packet information window or graphical window is analyzed online in a process of one vehicle bus tool software, the signal information in relevant packet information windows or graphical windows within the period of time in another or several processes of similar vehicle bus tool software can be synchronously viewed and vice versa.

Synchronous display between graphical windows can bring the following benefits: when a curve of one graphical window is viewed, a curve of the same time in another graphical window can be synchronously viewed to facilitate problem analysis.

Synchronous display between a graphical window and a packet information window can bring the following benefits: when it is found that a signal curve in a graphical window is abnormal, switching can be directly performed to a packet information window, and it is not required to position a problematic packet by rolling the scroll bar of the packet information window, but directly view a current display region of the packet information window because the display time span of the current display region of the packet information window has been automatically synchronized in the process of viewing the graphical window.

Various non-limiting implementations of the embodiments of the present disclosure will be detailed below in combination with the accompanying drawings.

As shown in FIG. 1, one or more embodiments provide a method of synchronously displaying measurement data, which includes the following steps.

At step S101, a synchronization identifier and a synchronization function are set for a plurality of measurement data display windows respectively.

At step S102, when a display time span of any measurement data display window in a paused state is modified, the synchronization function of other measurement data display windows in a paused state is called, and the synchronization identifier of the measurement data display window in a paused state is matched with the synchronization identifiers of other measurement data display windows in a paused state in the synchronization function, so as to achieve synchronization matching determination.

At step S103, if successful matching is achieved, synchronous operation is performed.

Figure 3:
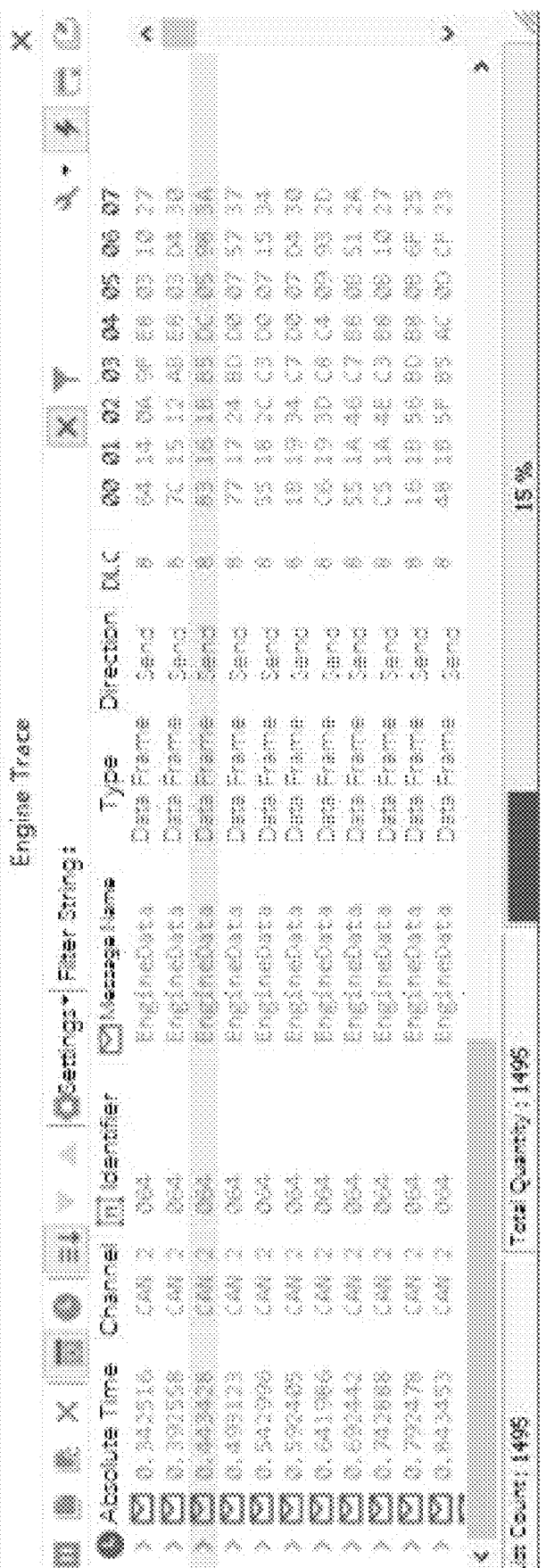
FIG. 3 is a schematic diagram illustrating a packet information window according to one or more embodiments of the present disclosure.

In some embodiments, as shown in FIGS. 2 and 3, the measurement data display windows include but not limited to a graphical window and a packet information window and the like. The synchronization identifier is a character string of information, which is used as an attribute of the measurement data display windows. The synchronization function is a callback function, which is defined by the base class of all measurement data display windows. Thus, each of the measurement data display windows can implement the callback function. Within the callback function, each measurement data display window determines how to perform synchronization on its own based on its own characteristics.

In some embodiments, a measurement data display window may be in a running state or a paused state. When the running state is activated, the measurement data display window can continuously track and display the latest signal state. When the paused state is activated, the measurement data display window will not track and display the latest signal state but maintain the current display, helping the user to analyze the signal data in the current display.

In some embodiments, the display time span includes two time points, which are a start time point and an end time point. If one of the time points is changed, it means the display time span is changed.

In some embodiments, the synchronous operation, for example, includes but not limited to the following action steps.

At step S201, a start time of the time axis of the current measurement data display window is set.

At step S202, an end time of the time axis of the current measurement data display window is set.

At step S203, the data display of the current measurement data display window is refreshed such that the current measurement data display window displays the data between the start time and the end time of the time axis.

In some embodiments, modifying the display time span of any measurement data display window in a paused state includes: triggering an event affecting the display time span; based on the event affecting the display time span, calculating a current display time span of the measurement data display window in a paused state; updating the display time span of the measurement data display window in a paused state to the current display time span.

In some embodiments, the event affecting the display time span is a trigger event. The trigger event specifically may include but not limited to a mouse event, a keyboard event and a program control event.

In some embodiments, the influence of the mouse event includes but not limited to: the left key of the mouse drags such that the display time span is translated leftward or rightward while the length of the display time span is unchanged;

the wheel of the mouse scales up and down such that the display time span is offset leftward or rightward, while the length of the display time span is scaled up or down.

In some embodiments, the influence of the keyboard event includes but not limited to:

pressing the left key or right key to enable the display time span to translate leftward or rightward while the length of the display time span is unchanged;

pressing the Home key to enable the display time span to translate leftward to a measurement start point, while the length of the display time span is unchanged;

pressing the End key to enable the display time span to translate rightward to a measurement end point, while the length of the display time span is unchanged;

pressing the E key to scale up the length of the display time;

pressing the D key to scale down the length of the display time;

pressing the I key to reset the length of the display time to a default length (20 seconds);

pressing the F key to set the start point of the display time span as the measurement start point and the end point of the display time span as the measurement end point.

In some embodiments, the influence of the program control event includes but not limited to:

calling the system API function "app.set_analysis_time_range", and introducing the two parameters, i.e. the start point of the display time span and the end point of the display time span to achieve automatic setting of the display time span.

The process of modifying the display time span of any measurement data display window in a paused state will be detailed below with a specific case.

Figure 4:
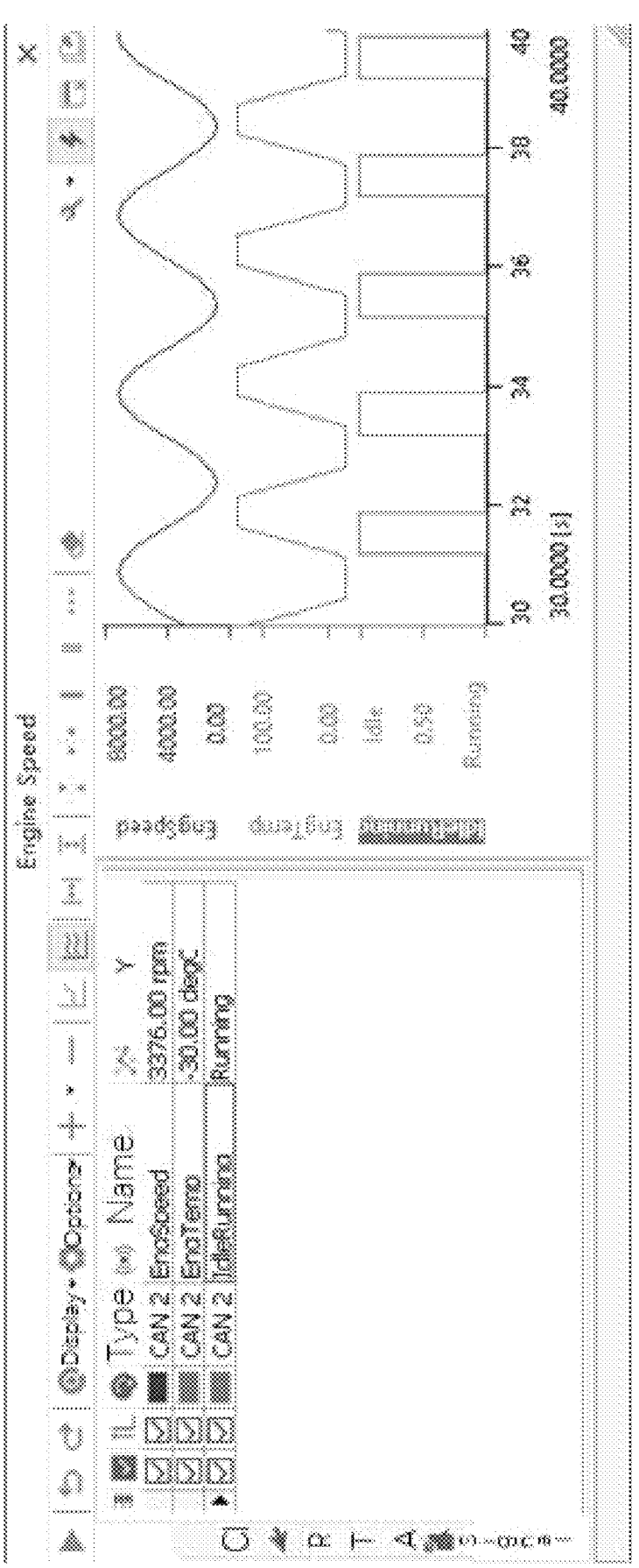
FIG. 4 is a schematic diagram illustrating a graphical window "EngineSpeed" in a paused state and a display time span of 30 seconds to 40 seconds according to one or more embodiments of the present disclosure.

As shown in FIG. 4, with the graphical window "EngineSpeed" in a software as an example, the graphical window is in a paused state and the current display time span is 30 seconds to 40 seconds.

Figure 5:
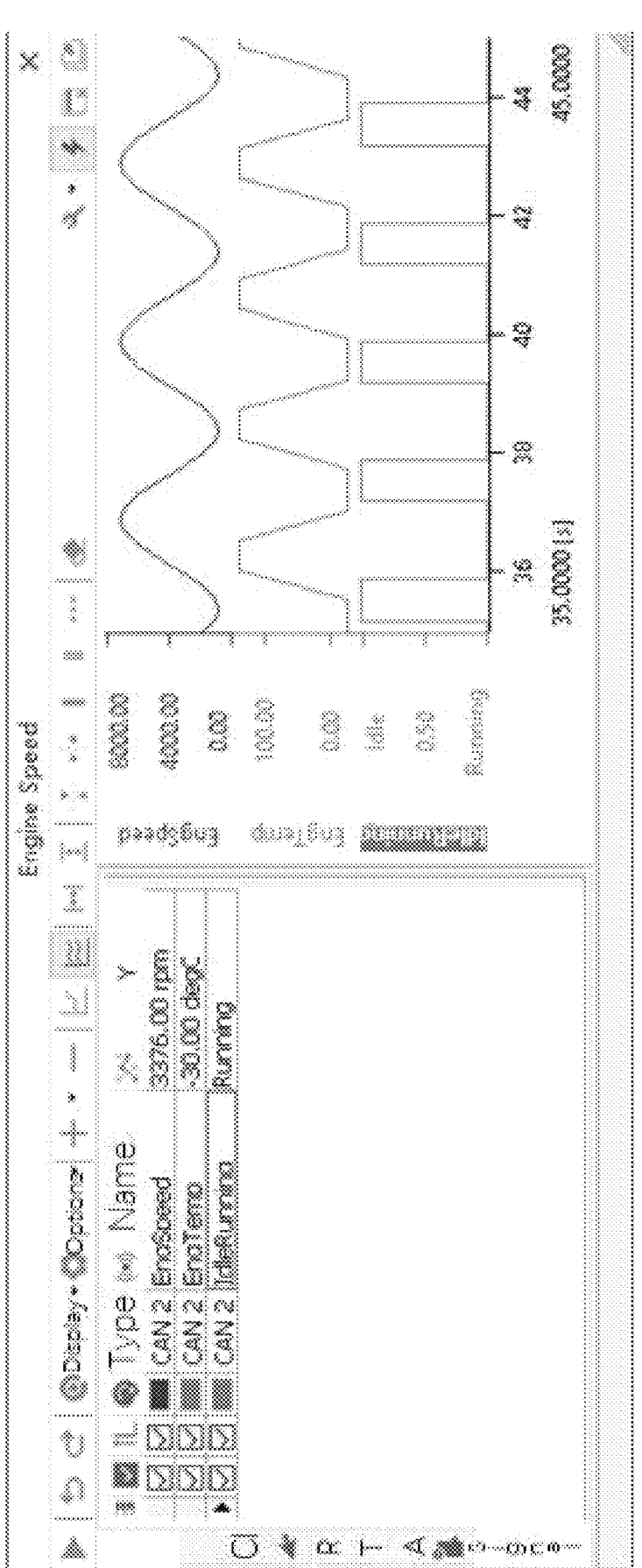
FIG. 5 is a schematic diagram illustrating a graphical window "EngineSpeed" in a paused state and a display time span of 35 seconds to 45 seconds according to one or more embodiments of the present disclosure.

When the display time span of the graphical window is translated rightward by 5 seconds, a display time span modification event bound to the graphical window is triggered. In a modification event processing function, the modified latest display time span is calculated firstly as a display time span with the start time point increased by 5 seconds and the end time point increased by 5 seconds, namely, the current display time span is modified to 35 seconds to 45 seconds; next, in the graphical window, the signal curve within the range of the display time span is updated as shown in FIG. 5.

In some embodiments, a method of matching the synchronization identifier of the measurement data display window in a paused state with the synchronization identifiers of other measurement data display windows in a paused state in the synchronization function includes:

determining whether the synchronization identifier of the measurement data display window in a paused state is identical to the synchronization identifiers of other measurement data display windows in a paused state, and if yes, achieving successful matching.

The method of matching the synchronization identifier of the measurement data display window in a paused state with the synchronization identifiers of other measurement data display windows in a paused state in the synchronization function will be detailed below with a specific case.

It is assumed that the graphical window A, the graphical window B and the graphical window C are all in a paused state. Their synchronization identifier list is as follows:

| Name of graphical window | Synchronization identifier |
| --- | --- |
| Graphical window A | DEFAULT |
| Graphical window B | CUSTOM |
| Graphical window C | DEFAULT |

When the display time span of the graphical window A changes, the synchronization matching determination may compare the synchronization identifier of the graphical window A with the synchronization identifiers of the graphical windows B and C and find that the synchronization identifier of the graphical window A is equal to the synchronization identifier of the graphical window C but not equal to the synchronization identifier of the graphical window B. Thus, the graphical window C will be synchronized by the graphical window A but the graphical window B will not be synchronized.

In some embodiments, a method of performing synchronization operation includes:

transferring the current display time span of any measurement data display window in a paused state as a parameter to the synchronization function of each of the successfully-matched measurement data display windows in a paused state;

modifying, by each of the successfully-matched measurement data display windows, the display time span of the successfully-matched measurement data display window to the display time span carried in parameters of the corresponding synchronization function, namely, making the display time span of each of the successfully-matched measurement data display windows consistent with the display time span of the measurement data display window in a paused state so as to achieve synchronization operation.

The method of performing synchronous operation will be detailed below with a specific case.

It is assumed that the graphical window A, the graphical window B and the graphical widow C are all in a paused state. Their synchronization identifier list is as follows:

| Name of graphical window | Synchronization identifier |
| --- | --- |
| Graphical window A | DEFAULT |
| Graphical window B | CUSTOM |
| Graphical window C | DEFAULT |

The initial display time span of the graphical window A is between the start time 1 second and the end time 3 seconds. The user modifies the display time span to one with the start time 2 seconds and the end time 6 seconds. Next, the synchronization matching determination reads the synchronization identifier of the graphical window A and its latest current display time span and uses them as parameters to call the synchronization functions of the graphical windows B and C. The graphical window B and the graphical window C determine whether their own synchronization identifiers are same as that of the graphical window A respectively within the synchronization function, and the determination result is that it is different from the graphical window B but same as the graphical window C.

The successfully-matched graphical window C then modifies its own display time span to the current display time span transferred by the graphical window A, the one with the start time 2 seconds and the end time 6 seconds. Thus, synchronous operation is accomplished on the graphical window A and the graphical window C and then the synchronization process is ended.

In some embodiments, a method of determining the measurement data display window is in a paused state includes:

determining whether a pause flag of the measurement data display window is true; if yes, determining the measurement data display window is in a paused state.

A method of determining the measurement data display window is in a paused state will be detailed below with a specific case.

Figure 6:
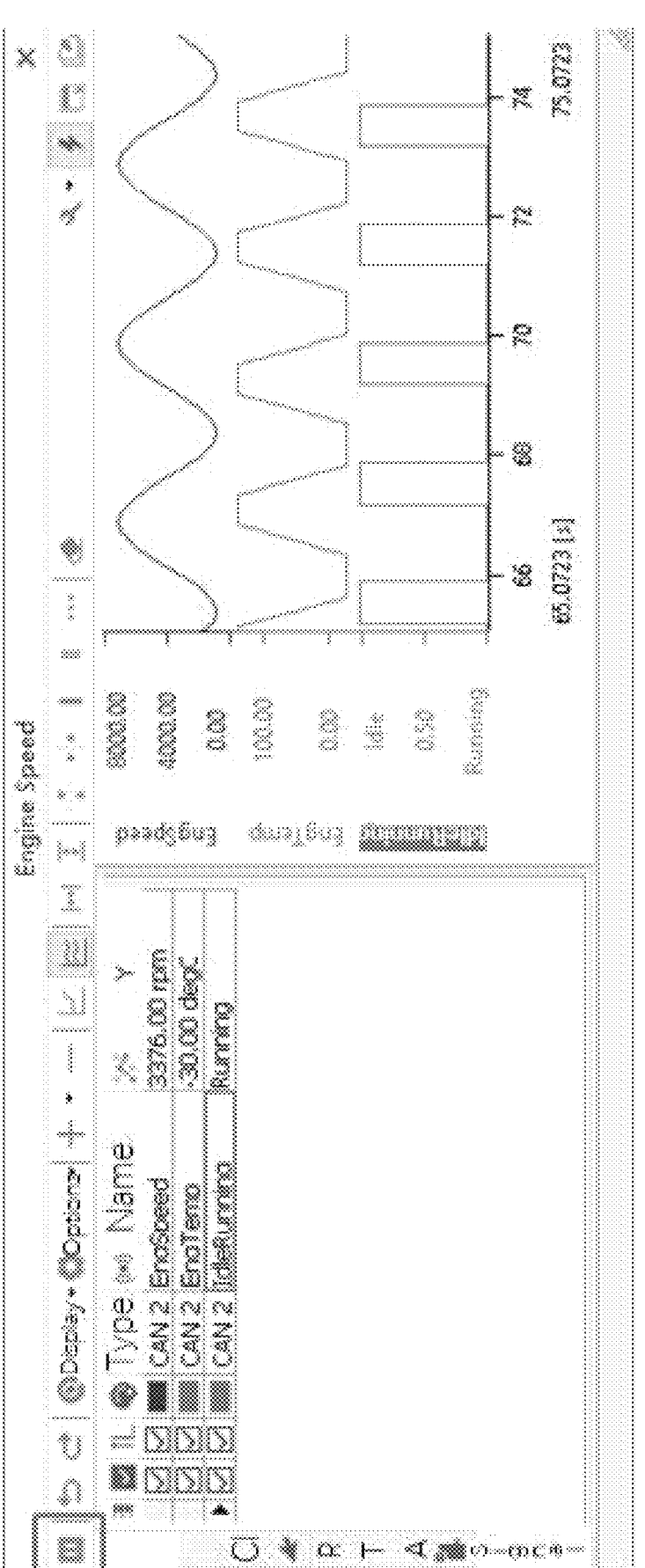
FIG. 6 is a schematic diagram illustrating a graphical window "EngineSpeed" in a measurement process according to one or more embodiments of the present disclosure.

As shown in FIG. 6, with the graphical window "EngineSpeed" as an example, there is a pause button in the graphical window "EngineSpeed", the button is displayed as "paused" and the user can click this button to pause the measurement.

Figure 7:
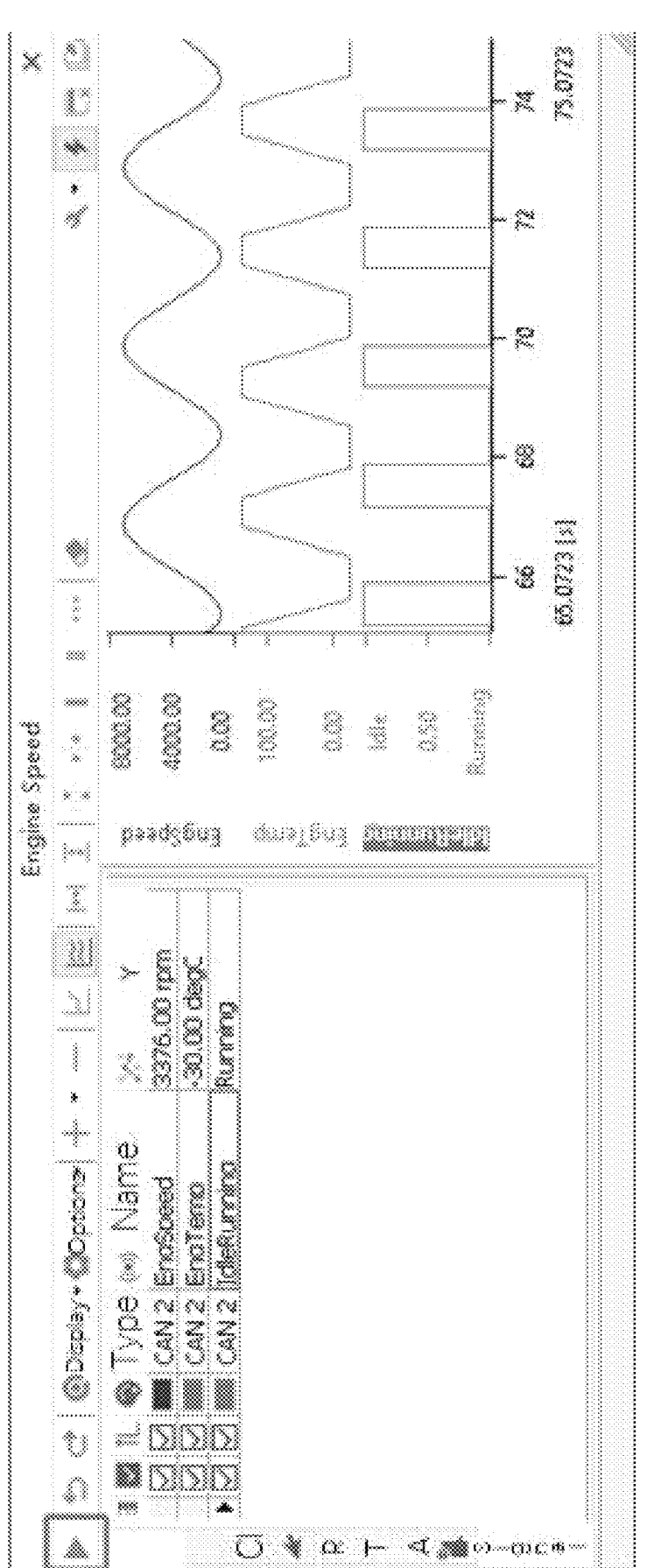
FIG. 7 is a schematic diagram illustrating a graphical window "EngineSpeed" in a paused state according to one or more embodiments of the present disclosure.

As shown in FIG. 7, after the user clicks the button, the variable associated with the button changes from false to true, which indicates the graphical window is in a paused state. At this time, the button is displayed as "run", and the user may click this button to continue measurement.

The user uses the graphical window "EngineSpeed" and the packet information window "EngineTrace" in a paused state to perform analysis on the vehicle bus. The synchronization identifiers of the two windows are "DEFAULT".

Figure 8:
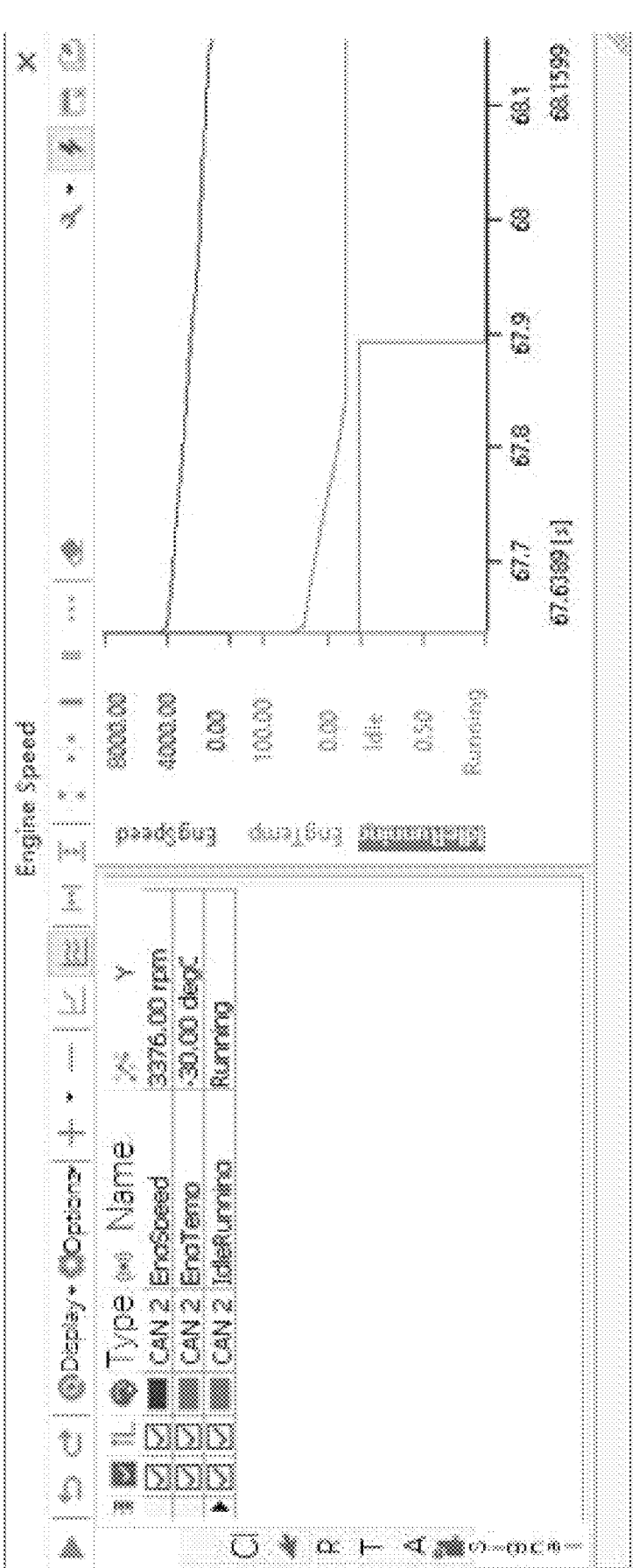
FIG. 8 is a schematic diagram illustrating a curve change of a signal "IdleRunning" in a graphical window according to one or more embodiments of the present disclosure.

As shown in FIG. 8, the user may drag the graphical window by using the left key of the mouse to observe the change of the signal curve over time in the graphical window. When the start time point of the display time span for the drag is close to 67.6 seconds, and the end time point is close to 68 seconds, it is found that the state of the signal "IdleRunning" changes from "Idle" to "Running".

Figure 9:
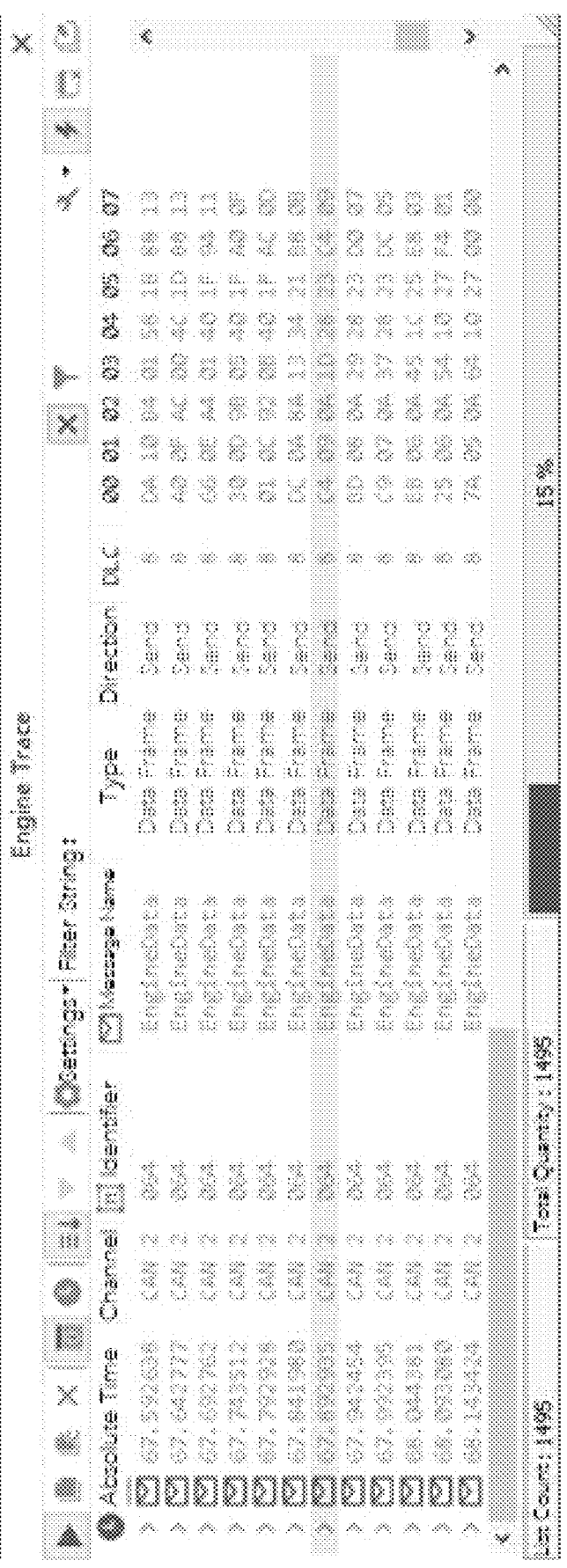
FIG. 9 is a schematic diagram illustrating a packet information window corresponding to the graphical window in FIG. 8 according to one or more embodiments of the present disclosure.
Figure 10:
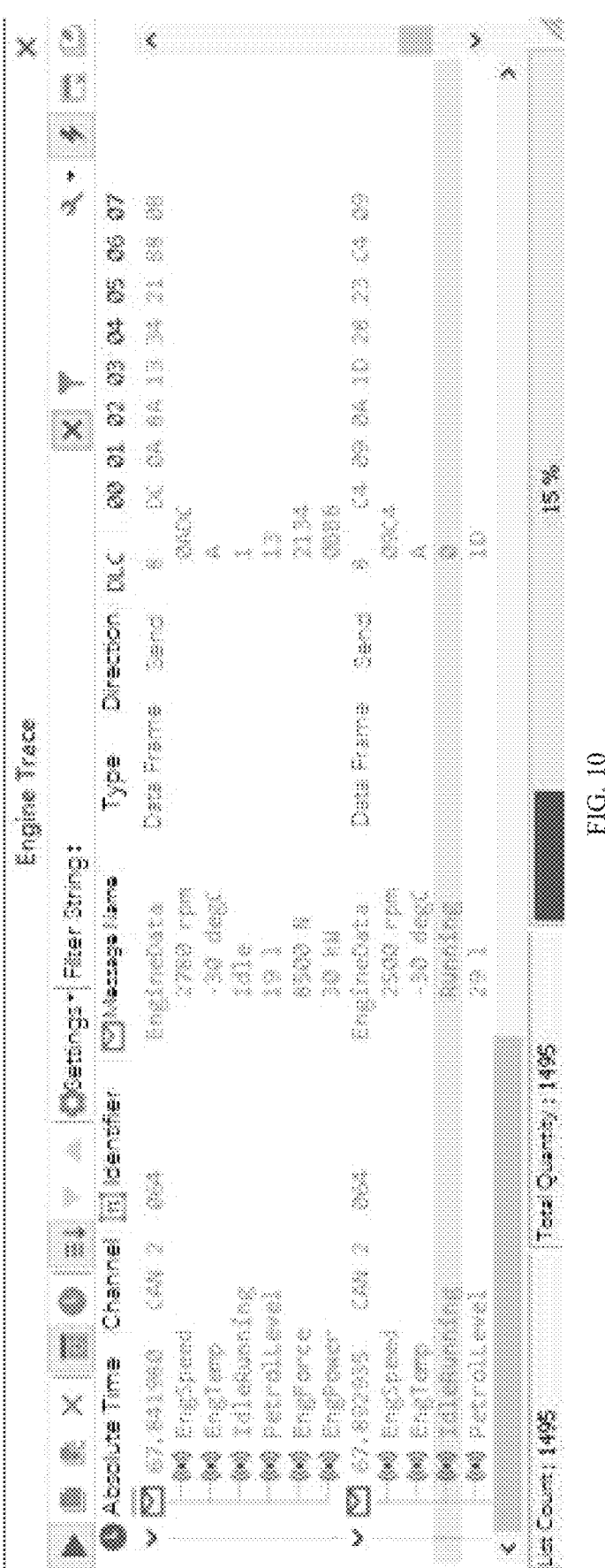
FIG. 10 is a schematic diagram illustrating a packet information window unfolded at the time of 67.892935 second moment according to one or more embodiments of the present disclosure.

The user hopes to view the values of other signals in the packet where the signal "IdleRunning" is located at the time of change of the signal. As shown in FIG. 9, at this time, the user switches to the packet information window "EngineTrace". Since the window is also in a paused state and the synchronization identifier is identical to that of the graphical window "EngineSpeed", the display time span of the window is the same as the display time span of the graphical window "EngineSpeed".

As shown in FIG. 9, the user can immediately position the change time of the signal "IdleRunning" by simply unfolding the packet, one frame previous to the time of 67.9 seconds. It can be seen that the value of the signal "IdleRunning" at the time of 67.841980 seconds is "Idle" whereas the value of the signal at the time of 67.892935 is "Running", which indicates that the time of 67.892935 seconds is the change time of the signal. Thus, by unfolding other signals of the packet where the signal is located at the time of 67.892935 seconds, the values of other signals of the packet where the signal is located can be observed.

Figure 11:
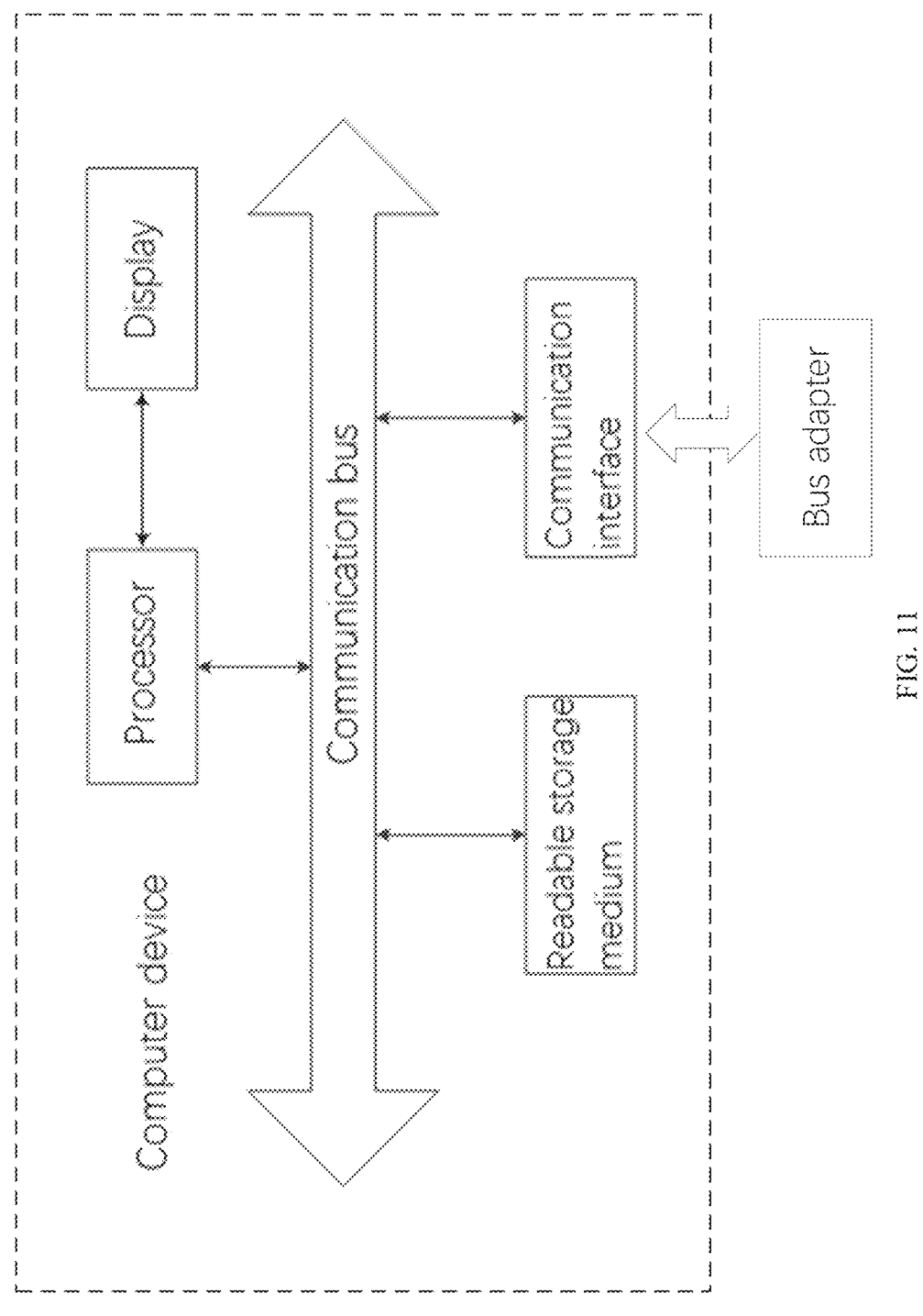
FIG. 11 is a principle block diagram illustrating a system for synchronously displaying measurement data in a vehicle bus tool software according to one or more embodiments of the present disclosure.

As shown in FIG. 11, one or more embodiments further provide a system for synchronously displaying measurement data, which includes:

at least one bus adapter, configured to obtain a plurality of pieces of measurement data from an Electronic Control Unit (ECU);

at least one computer device, including a processor, a display communicating with the processor to present a graphical interface, a readable storage medium, a communication bus and a communication interface; wherein, the processor, the readable storage medium and the communication interface communicate with the bus adapter via the communication bus;

the readable storage medium is configured to store an instruction program;

the processor is configured to, after the plurality of pieces of measurement data are obtained, execute the instruction program to perform the operations of: setting a synchronization identifier and a synchronization function for a plurality of measurement data display windows respectively; when a display time span of any measurement data display window in a paused state is modified, calling the synchronization function of other measurement data display windows in a paused state, and matching the synchronization identifier of the measurement data display window in a paused state with the synchronization identifiers of other measurement data display windows in a paused state in the synchronization function; if successfully matching, performing synchronization operation;

the display displays, through the graphical interface, an interface in which at least one measurement data display window and/or a plurality of measurement data display windows perform synchronous display.

In some embodiments, the system for synchronously displaying measurement data can be applied to the vehicle bus tool software as well as data collection and analysis of other debugging devices.

In some embodiments, there is further provided a method of executing the system for synchronously displaying measurement data, including:

obtaining a plurality of pieces of measurement data from the ECU via the bus adapter;

after obtaining a plurality of pieces of ECU measurement data, setting a synchronization identifier and a synchronization function for a plurality of measurement data display windows respectively; when a display time span of any measurement data display window in a paused state is modified, calling the synchronization function of other measurement data display windows in a paused state, and matching the synchronization identifier of the measurement data display window in a paused state with the synchronization identifiers of other measurement data display windows in a paused state in the synchronization function; if successfully matching, performing synchronization operation.

displaying, through a graphical interface, an interface in which at least one measurement data display window and/or a plurality of measurement data display windows perform synchronous display.

In the system for synchronously displaying measurement data and the method for executing the system of synchronously displaying measurement data, the method of synchronously displaying measurement data can be referred to the above detailed descriptions and will not be repeated herein.

Figure 12:
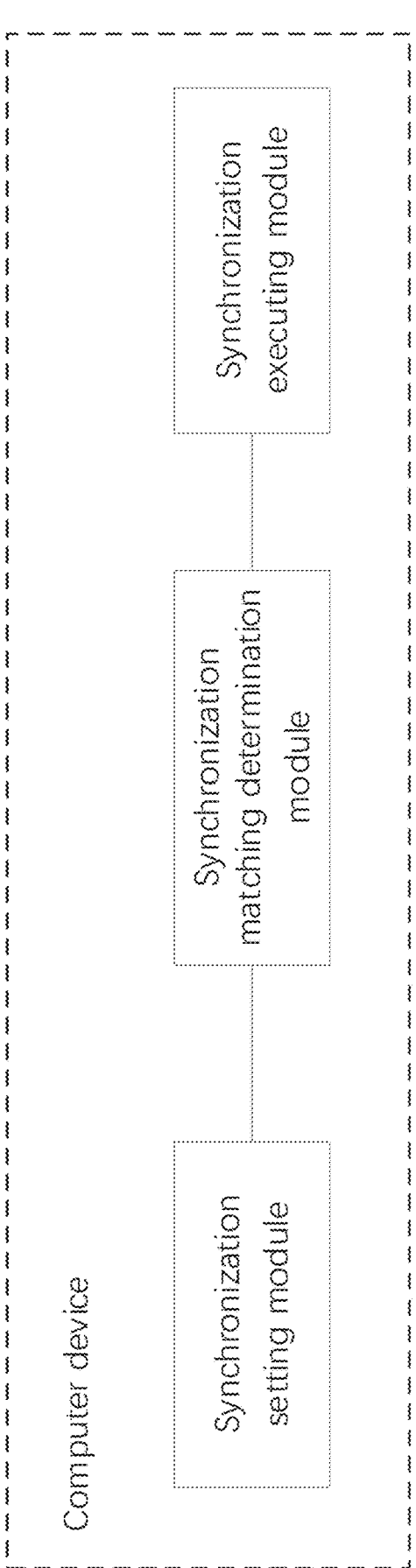
FIG. 12 is a principle block diagram illustrating a system for synchronously displaying measurement data according to one or more embodiments of the present disclosure.

As shown in FIG. 12, one or more embodiments further provide a system for synchronously displaying measurement data in a vehicle bus tool software, which includes:

executing a synchronization setting module, a synchronization matching determination module and a synchronization executing module, wherein, the synchronization setting module is configured to set a synchronization identifier and a synchronization function for a plurality of measurement data display windows respectively;

the synchronization matching determination module is configured to, when a display time span of any measurement data display window in a paused state is modified, call the synchronization function of other measurement data display windows in a paused state, and match the synchronization identifier of the measurement data display window in a paused state with the synchronization identifiers of other measurement data display windows in a paused state in the synchronization function; and, the synchronization executing module is configured to, if the synchronization matching determination module determines matching as successful, perform synchronization operation.

Computer instructions corresponding to the specific implementation functions of the synchronization setting module, the synchronization matching determination module and the synchronization executing module are stored in a computer readable storage medium and can be implemented in a computer device with reference to the contents of the above method of synchronously displaying measurement data and thus no redundant descriptions are made herein.

One or more embodiments further provide an apparatus, which includes: at least one memory and at least one processor, where the memory stores computer executable instructions which are executed by a processor to perform the method of synchronously displaying measurement data; the method of synchronously displaying measurement data includes: setting a synchronization identifier and a synchronization function for a plurality of measurement data display windows respectively; when a display time span of any measurement data display window in a paused state is modified, calling the synchronization function of other measurement data display windows in a paused state, and matching the synchronization identifier of the measurement data display window in a paused state with the synchronization identifiers of other measurement data display windows in a paused state in the synchronization function; if successfully matching, performing synchronization operation. Reference can be made to the detailed descriptions of the method of synchronously displaying measurement data and no redundant descriptions are made herein.

An electronic device in the embodiments of the present disclosure will be described below from the angle of hardware processing.

The specific implementations of some embodiments do not constitute any limitation to the specific implementation of the electronic device.

Figure 13:
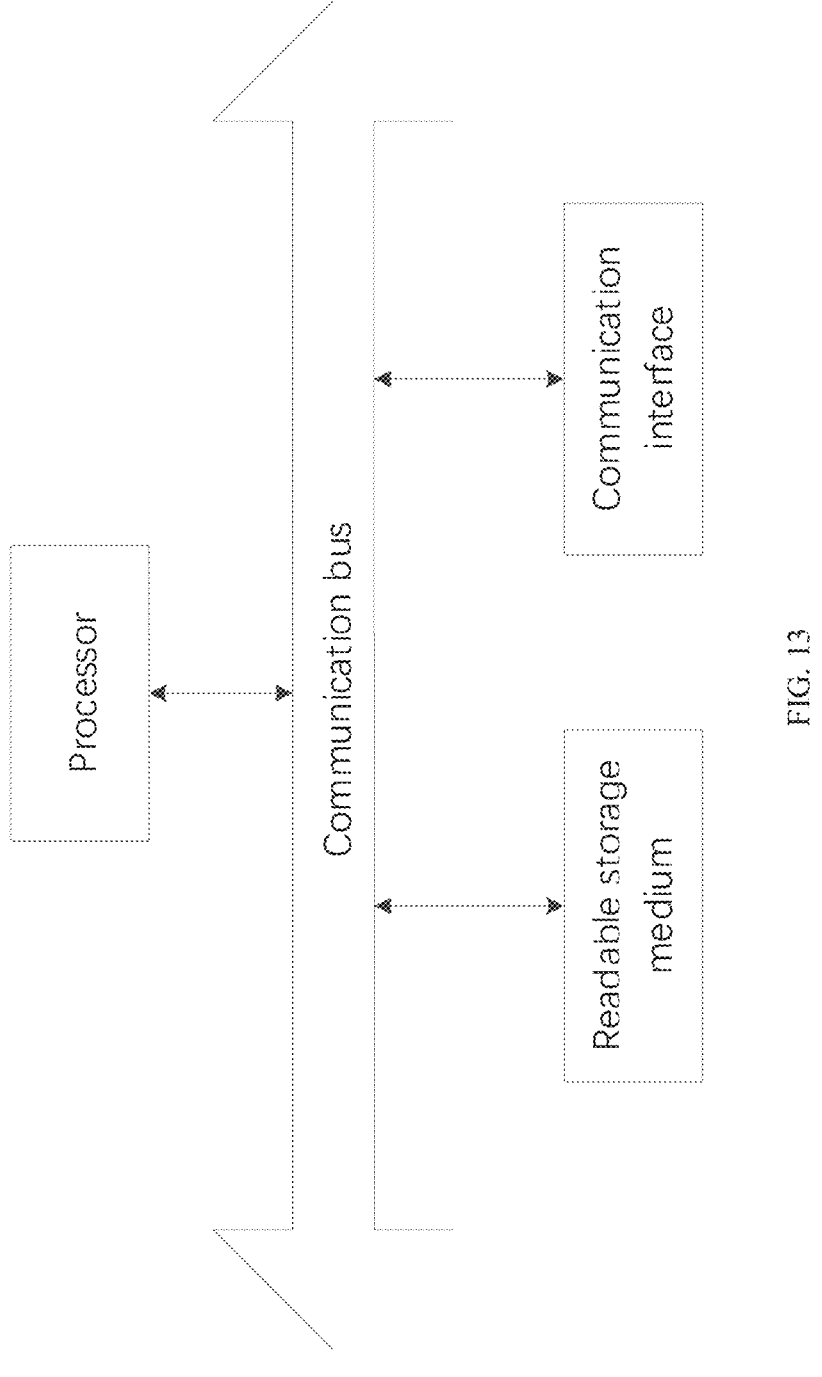
FIG. 13 is a principle block diagram illustrating an electronic device or apparatus according to one or more embodiments of the present disclosure.

As shown in FIG. 13, the specific implementation of the electronic device is not limited in some embodiments of the present disclosure.

In some embodiments, the communication interface may be RS232, RS485, USB interface or TYPE interface or the like, which may be connected with an external bus adapter. The communication interface may also include wired or wireless network interface. The network interface may optionally include wired interface and/or wireless interface (such as WI-FI interface, Bluetooth interface and the like), which is usually used to establish communication connection between the server and other computer devices.

The readable storage medium or the computer readable storage medium includes at least one type of memories. The memory includes flash memory, harddisk drive, multimedia card, card type memory (e.g. SD memory or the like), magnetic memory, magnetic disk or compact disk or the like. In some embodiments, the memory may be an internal storage unit in the computer device, for example, a harddisk drive of the computer device. In some other embodiments, the memory may also be an external storage device of the computer device, for example, a plug type hard disk drive, a smart media card (SMC), a secure digital (SD) card, a flash card or the like on the computer device. Furthermore, the memory may include both the internal storage unit in the computer device and the external storage device. The memory may be used to not only store an application software installed on the computer device and various types of data, for example, the codes of the computer programs and the like but also temporarily store data already output or to be output.

In some embodiments, the processor may be a central processing unit (CPU), a processor, a controller, a microcontroller, a microprocessor or another data processing chip, which is used to run the program codes in the memory or process the data, for example, execute the computer programs or the like.

In some embodiments, the communication bus may also be an input/output bus, which may be a Peripheral Component Interconnect (PCI) bus, or an Enhanced Industry Standard Architecture (EISA) bus or the like. The bus may include an address bus, a data bus and a control bus and the like.

Optionally, the computer device may also include a user interface, which may include a display, and an input unit, for example, a keyboard. Optionally, the user interface may also include a standard wired interface and wireless interface. Optionally, in some embodiments, the display may be an LED display, a liquid crystal display, a touch liquid crystal display and an Organic Light-Emitting Diode (OLED) touch display and the like. The display may also be appropriately referred to as display screen or display unit for displaying information processed in the computer device as well as a visual user interface.

As shown in FIG. 13, the present electronic device includes: a processor, a readable storage medium (also called memory), a communication bus and a communication interface, where the processor, the readable storage medium and the communication interface communicate with each other via the communication bus; the readable storage medium is configured to store programs of executing the method of synchronously displaying measurement data, where the programs cause the processor to perform the operations corresponding to the method of synchronously displaying measurement data; the method of synchronously displaying measurement data includes: setting a synchronization identifier and a synchronization function for a plurality of measurement data display windows respectively; when a display time span of any measurement data display window in a paused state is modified, calling the synchronization function of other measurement data display windows in a paused state, and matching the synchronization identifier of the measurement data display window in a paused state with the synchronization identifiers of other measurement data display windows in a paused state in the synchronization function; if successfully matching, performing synchronization operation. Reference can be made to the detailed descriptions of the method of synchronously displaying measurement data and no redundant descriptions are made herein.

In other embodiments, the specific hardware structure of the computer device, the industrial personal computer and apparatus can also be used as one of the electronic device.

The processor executes the programs to perform the steps in the embodiments of the method of synchronously displaying measurement data as shown in FIG. 1, for example, the steps S101 to S103 shown in FIG. 1. Alternatively, the processor executes the computer programs to implement the functions of the modules or units in the apparatus embodiments.

One or more embodiments further provide a computer readable storage medium configured to store programs of executing any one of the above methods of synchronously displaying measurement data.

One or more embodiments further provide a computer readable storage medium, storing computer readable instructions, where the computer readable instructions are executed by at least one processor to perform the above method of synchronously displaying measurement data through the following steps: setting a synchronization identifier and a synchronization function for a plurality of measurement data display windows respectively; when a display time span of any measurement data display window in a paused state is modified, calling the synchronization function of other measurement data display windows in a paused state, and matching the synchronization identifier of the measurement data display window in a paused state with the synchronization identifiers of other measurement data display windows in a paused state in the synchronization function; if successfully matching, performing synchronization operation. Reference can be made to the detailed descriptions of the method of synchronously displaying measurement data and no redundant descriptions are made herein.

One or more embodiments provide a computer program product, including computer programs or instructions, where the computer programs or instructions are executed on a computer to cause the computer to perform any one of the above methods of synchronously displaying measurement data.

One or more embodiments provide a computer program product, including a computer readable storage medium storing computer readable program codes, where the computer readable program codes include instructions which cause at least one processor or one or more computer devices to perform the operations of:

setting a synchronization identifier and a synchronization function for a plurality of measurement data display windows respectively;

when a display time span of any measurement data display window in a paused state is modified, calling the synchronization function of other measurement data display windows in a paused state, and matching the synchronization identifier of the measurement data display window in a paused state with the synchronization identifiers of other measurement data display windows in a paused state in the synchronization function; if successfully matching, performing synchronization operation.

Optionally, as one possible implementation, these instructions can also cause at least one processor or one or more computer devices to perform the operations:

modifying the display time span of any measurement data display window in a paused state includes: triggering an event affecting the display time span; based on the event affecting the display time span, calculating a current display time span of the measurement data display window in a paused state; updating the display time span of the measurement data display window in a paused state to the current display time span.

Optionally, as one possible implementation, these instructions can also cause at least one processor or one or more computer devices to perform the operations: the event affecting the display time span includes a mouse event, a keyboard event and a program control event.

Optionally, as one possible implementation, at least one processor or one or more computer devices can also be configured to perform the following steps:

a method of matching the synchronization identifier of the measurement data display window in a paused state with the synchronization identifiers of other measurement data display windows in a paused state in the synchronization function includes: determining whether the synchronization identifier of the measurement data display window in a paused state is identical to the synchronization identifiers of other measurement data display windows in a paused state, and if yes, achieving successful matching.

Optionally, as one possible implementation, these instructions can also cause at least one processor or one or more computer devices to perform the operations: a method of performing synchronization operation includes: transferring the current display time span of any measurement data display window in a paused state as a parameter to the synchronization function of each of the successfully-matched measurement data display windows in a paused state; modifying, by each of the successfully-matched measurement data display windows, the display time span of the successfully-matched measurement data display window to the display time span carried in parameters of the corresponding synchronization function, namely, making the display time span of each of the successfully-matched measurement data display windows consistent with the display time span of the measurement data display window in a paused state so as to achieve synchronization operation.

Optionally, as one possible implementation, these instructions can also cause at least one processor or one or more computer devices to perform the operations: a method of determining the measurement data display window is in a paused state includes: determining whether a pause flag of the measurement data display window is true; if yes, determining the measurement data display window is in a paused state.

Optionally, as one possible implementation, these instructions can also cause at least one processor or one or more computer devices to perform the operations: the synchronization identifier is a character string type.

Optionally, as one possible implementation, these instructions can also cause at least one processor or one or more computer devices to perform the following operations: the measurement data display window is a graphical window or a packet information window.

In some embodiments, a plurality of pieces of measurement data are obtained from the ECU (Electronic Control Unit) by communicating with the debugging device, such as ECU and relevant systems, based on Unified Diagnostic Services (UDS) or Universal Measurement and Calibration Protocol (XCP) or CAN Calibration Protocol (CCP).

In some embodiments, the debugging device in the vehicle field may specifically be a vehicular Electronic Control Unit (ECU) and its relevant system, for example, includes but not limited to: Electric Power Steering System (EPS), Anti-lock Braking System (ABS), Electronic Stability Control (ESC), vehicle engine management system and Battery Management System (BMS) and the like, which can be connected to the computer device via a bus to receive a plurality of pieces of measurement data.

In the several embodiments provided by the present disclosure, it should be understood that the disclosed device and method can be implemented another way. The above device embodiments are merely illustrative, for example, the flowcharts or block diagrams in the drawings show possible system architectures, functions and operations of the device, method, and computer program product in the several embodiments provided by the present disclosure. Thus, each block in the flowcharts or block diagrams may represent one module, one program fragment or one part of codes. The module, the program fragment or the part of codes includes one or more executable instructions for implementing the specified logic functions. It should be noted that in some alternative embodiments, the functions indicated in the blocks may also be performed in a sequence different from that indicated in the drawings. For example, two continuous blocks can be actually performed basically in parallel, and sometimes may be performed in a reverse sequence, which is dependent on the functions involved. It is further noted that each block in the block diagrams and/or flowcharts and the combinations of the blocks in the block diagrams and/or flowcharts may be implemented by a dedicated hardware-based system for executing specified functions or actions, or by combination of dedicated hardware and computer instructions.

Furthermore, the functional modules in the embodiments of the present disclosure can be integrated into one independent part, or exist as separate modules or two or more of the modules are integrated into one independent part.

The functions, when implemented by software function modules and sold or used as independent products, can be stored in one computer readable storage medium. Based on such understanding, the essence of technical solutions of the present disclosure, or a part contributing to the prior arts or a part of the technical solutions can be embodied in the form of software product. The computer software product is stored in one storage medium which includes several instructions to enable one computer device (for example, a personal computer, a server, or a network device or the like) to perform all or part of the steps of the method of each of the embodiments of the present disclosure.

Enlightened by the ideal embodiments of the present disclosure, relevant workers can, based on the contents of the specification, make various changes and modifications within the scope of protection of the technical idea of the present disclosure. The technical scope of the present disclosure is not limited to the contents of the specification but to the technical scope claimed by the claims.

What is claimed is:

1. A method of synchronously displaying measurement data, comprising:

setting a synchronization identifier and a synchronization function for each of a plurality of measurement data display windows;

wherein each of the plurality of measurement data display windows comprises a time axis and displays measurement data between a start time and an end time of the time axis;

when a display time span defined by the start time and the end time of the time axis, of one of the plurality of measurement data display windows in a paused state is modified, calling by the measurement data display window in the paused state, the synchronization function of each other measurement data display windows in the paused state, and comparing the synchronization identifier of the measurement data display window in the paused state with the synchronization identifiers of the other measurement data display windows in the paused state in the synchronization function;

if successfully matching, performing a synchronization operation that synchronizes the display time spans of the matched measurement data display windows.

2. The method of claim 1, wherein modifying the display time span of the measurement data display window in the paused state comprises:

triggering an event affecting the display time span;

based on the event affecting the display time span, calculating a current display time span of the measurement data display window in the paused state;

updating the display time span of the measurement data display window in the paused state to the current display time span.

3. The method of claim 2, wherein the event affecting the display time span is a trigger event.

4. The method of claim 3, wherein the trigger event comprises a mouse event, a keyboard event, and a program control event.

5. The method of claim 1, wherein matching the synchronization identifier of the measurement data display window in the paused state with the synchronization identifiers of the other measurement data display windows in the paused state in the synchronization function comprises:

determining whether the synchronization identifier of the measurement data display window in the paused state is identical to the synchronization identifiers of the other measurement data display windows in the paused state, and if yes, achieving successful matching.

6. The method of claim 1, wherein performing the synchronization operation comprises:

transferring a current display time span of the measurement data display window in the paused state as a parameter to the synchronization function of each of successfully-matched measurement data display windows in the paused state;

modifying, by each of the successfully-matched measurement data display windows, the display time span of a successfully-matched measurement data display window to the display time span carried in parameters of a corresponding synchronization function by making the display time span of each of the successfully-matched measurement data display windows consistent with the display time span of the measurement data display window in the paused state to achieve the synchronization operation.

7. The method of claim 1, wherein determining the measurement data display window is in the paused state comprises:

determining whether a pause flag of the measurement data display window is true; if yes, determining the measurement data display window is in the paused state.

8. The method of claim 1, wherein the measurement data display window comprises a graphical window or a packet information window.

9. The method of claim 1, wherein the method of synchronously displaying the measurement data is applied to a synchronous display of vehicle bus measurement data in a vehicle bus tool software.

10. An apparatus, comprising:

at least one memory and at least one processor, wherein the at least one memory stores computer executable instructions, wherein the computer executable instructions are executed by the at least one processor to perform a method of synchronously displaying measurement data;

wherein the method of synchronously displaying the measurement data comprises:

setting a synchronization identifier and a synchronization function for each of a plurality of measurement data display windows;

wherein each of the plurality of measurement data display windows comprises a time axis and displays measurement data between a start time and an end time of the time axis;

when a display time span defined by the start time and the end time of the time axis, of one of the plurality of measurement data display windows in a paused state is modified, calling by the measurement data display window in the paused state, the synchronization function of each other measurement data display windows in the paused state, and comparing the synchronization identifier of the measurement data display window in the paused state with the synchronization identifiers of the other measurement data display windows in the paused state in the synchronization function;

if successfully matching, performing a synchronization operation that synchronizes the display time spans of the matched measurement data display windows.

11. The apparatus of claim 10, wherein modifying the display time span of the measurement data display window in the paused state comprises:

triggering an event affecting the display time span;

based on the event affecting the display time span, calculating a current display time span of the measurement data display window in the paused state;

updating the display time span of the measurement data display window in the paused state to the current display time span.

12. The apparatus of claim 11, wherein the event affecting the display time span is a trigger event, wherein the trigger event comprises a mouse event, a keyboard event, and a program control event.

13. The apparatus of claim 10, wherein matching the synchronization identifier of the measurement data display window in the paused state with the synchronization identifiers of the other measurement data display windows in the paused state in the synchronization function comprises:

determining whether the synchronization identifier of the measurement data display window in the paused state is identical to the synchronization identifiers of the other measurement data display windows in the paused state, and if yes, achieving successful matching.

14. The apparatus of claim 10, wherein performing the synchronization operation comprises:

transferring a current display time span of the measurement data display window in the paused state as a parameter to the synchronization function of each of successfully-matched measurement data display windows in the paused state;

modifying, by each of the successfully-matched measurement data display windows, the display time span of a successfully-matched measurement data display window to the display time span carried in parameters of a corresponding synchronization function by making the display time span of each of the successfully-matched measurement data display windows consistent with the display time span of the measurement data display window in the paused state to achieve the synchronization operation.

15. The apparatus of claim 10, wherein determining the measurement data display window is in the paused state comprises:

determining whether a pause flag of the measurement data display window is true; if yes, determining the measurement data display window is in the paused state.

16. The apparatus of claim 10, wherein the measurement data display window comprises a graphical window or a packet information window.

17. A non-transitory computer readable storage medium, storing computer readable instructions, wherein the computer readable instructions are executed by at least one processor to perform a method of synchronously displaying measurement data;

the method of synchronously displaying the measurement data comprises:

setting a synchronization identifier and a synchronization function for each of a plurality of measurement data display windows;

wherein each of the plurality of measurement data display windows comprises a time axis and displays measurement data between a start time and an end time of the time axis;

when a display time span defined by the start time and the end time of the time axis, of one of the plurality of measurement data display windows in a paused state is modified, calling by the measurement data display window in the paused state, the synchronization function of each other measurement data display windows in the paused state, and comparing the synchronization identifier of the measurement data display window in the paused state with the synchronization identifiers of the other measurement data display windows in the paused state in the synchronization function;

if successfully matching, performing a synchronization operation that synchronizes the display time spans of the matched measurement data display windows.

18. The non-transitory computer readable storage medium of claim 17, wherein modifying the display time span of the measurement data display window in the paused state comprises:

triggering an event affecting the display time span;

based on the event affecting the display time span, calculating a current display time span of the measurement data display window in the paused state;

updating the display time span of the measurement data display window in the paused state to the current display time span.

* * * * *